US012240133B2

(12) United States Patent
Reinprecht

(10) Patent No.: US 12,240,133 B2
(45) Date of Patent: Mar. 4, 2025

(54) HAIR REMOVAL DEVICE

(71) Applicant: Braun GmbH, Kronberg (DE)

(72) Inventor: Sebastian Reinprecht, Bartholomae (AT)

(73) Assignee: Braun GmbH, Kronberg (DE)

( * ) Notice: Subject to any disclaimer, the term of this patent is extended or adjusted under 35 U.S.C. 154(b) by 298 days.

(21) Appl. No.: 17/850,789

(22) Filed: Jun. 27, 2022

(65) Prior Publication Data

US 2022/0410420 A1 Dec. 29, 2022

(51) Int. Cl.
*B26B 19/20* (2006.01)
*B26B 19/06* (2006.01)
*B26B 19/38* (2006.01)

(52) U.S. Cl.
CPC .............. *B26B 19/20* (2013.01); *B26B 19/06* (2013.01); *B26B 19/3813* (2013.01)

(58) Field of Classification Search
CPC ...... B26B 19/20; B26B 19/06; B26B 19/3813
USPC .............................................................. 30/200
See application file for complete search history.

(56) References Cited

U.S. PATENT DOCUMENTS 4,888,870 A * 12/1989 Fujikawa ................ B26B 19/20 30/200
5,259,115 A * 11/1993 Bluder .................... B26B 19/20 30/201
9,393,707 B2 * 7/2016 Wevers ............... B26B 19/3853
10,029,377 B2 * 7/2018 Zijlstra ............... B26B 19/3886
2003/0056374 A1 * 3/2003 Langley .................. B26B 19/20 30/200
2017/0361476 A1 * 12/2017 Phoon ................... B26B 19/063
2018/0222068 A1 * 8/2018 Halmut ................... B26B 19/20
2019/0009418 A1 * 1/2019 Baltussen ........... B26B 19/3826
2024/0058974 A1 * 2/2024 Gassman ................ B26B 19/06
2024/0066731 A1 * 2/2024 Piesker ............... B26B 19/3813

FOREIGN PATENT DOCUMENTS

DE 3623591 A1 1/1988
EP 0176372 A1 4/1986
EP 1632321 A1 3/2006

OTHER PUBLICATIONS

Extended EP Search Report and Written Opinion for EP21182056.8 dated Nov. 15, 2021, 08 pages.
PCT Search Report and Written Opinion for PCT/IB2022/055996 dated Sep. 12, 2022, 14 pages.

* cited by examiner

*Primary Examiner* — Omar Flores Sanchez
(74) *Attorney, Agent, or Firm* — Andres E. Velarde; Kevin C. Johnson

(57) ABSTRACT

The invention relates to a hair removal device, comprising: a handle having a motor, a cutting head having a blade unit with a first and second blade for cutting hair, said cutting head having a first snap fit connector and a comb attachment releasably attachable to the cutting head, said comb attachment having a second snap fit connector provided to engage by snap fit connection with the first snap fit connector for attaching the comb attachment at the cutting head, wherein, said first snap fit connector is at least one of: formed in a shape to flex, made of a material to flex or supported to flex, so that said first snap fit connector is able to flex when brought into engagement with said second snap fit connector.

14 Claims, 4 Drawing Sheets

HAIR REMOVAL DEVICE

FIELD OF THE INVENTION

The invention relates to a hair removal device, in particular an electric shaver or a hair trimmer, comprising: a handle having a motor, a cutting head having a blade unit with a first and second blade for cutting hair, said blade unit being driven by said motor, so that at least one of said first and second blade reciprocates to the other in a reciprocation direction, said cutting head having a first snap fit connector and a comb attachment releasably attachable to the cutting head, said comb attachment having a second snap fit connector provided to engage by snap fit connection with the first snap fit connector for attaching the comb attachment at the cutting head.

BACKGROUND OF THE INVENTION

With hair removal devices such as beard trimmers usually the shape and/or the beard hear length may be trimmed. In order to adjust the length of the hair to be cut distance combs are provided which cooperate with a cutting edge and which add more distance between the cutting edge and the skin surface. Other attachments may be used for e.g. assuring that the sharp cutting edge is safely kept away from thin sensible skin areas. Those attachments may be releasably attached to a cutting head of a hair trimmer or an electric shaver and exchanged with each other in accordance with the desired use. The attachments are attached to the cutting head by means of latches, hooks, snap fit or other types.

It was found that existing snap fit connections suffer from the problem of adding to much bulkiness to the overall dimensions and or are insufficiently easy to handle. Although the snap fit connection per se appears as a rather simple way of connecting parts, those plastic parts to be attached may get broken at those connections first, if this is combined with a required rather unintuitive or cumbersome attachment and detachment of the comb from the cutting head.

SUMMARY OF THE INVENTION

It is an objective underlying the present invention to provide for an improved hair removal device avoiding at least one of the disadvantages of the prior art and/or further developing the existing solutions. A more particular objective underlying the invention is to provide for a hair removal device having an improved snap fit connection between a cutting head and a comb attachment.

This objective is addressed by a hair removal device, in particular an electric shaver or a hair trimmer, comprising: a handle having a motor, a cutting head having a blade unit with a first and second blade for cutting hair, said blade unit being driven by said motor, so that at least one of said first and second blade reciprocates relative to the other in a reciprocation direction, said cutting head having a first snap fit connector and a comb attachment releasably attachable to the cutting head, said comb attachment having a second snap fit connector provided to engage by snap fit connection with the first snap fit connector for attaching the comb attachment at the cutting head, wherein said first snap fit connector is at least one of: formed in a shape to flex, made of a material to flex or supported to flex, so that said first snap fit connector is able to flex when brought into engagement with said second snap fit connector. A flexing form of said first snap fit connector may be achieved by thinner material thicknesses in the area of the snap fit projection or by an outer shape of the surrounding area which allows flexing. An example of a flexing material is rubber or TPE elastic thermoplastic in the surrounding area of the snap fit or the projection itself. The first snap fit connector may also or alternatively be supported to flex. In this case the snap fit projection may be provided on a wall element that is at least at some sides unconnected to the rest of the housing so that at least one or more slots or free space(s) is/are created adjacent to the snap fit projection. Such lack of connection to other housing parts may e.g. create a flexing tongue onto which the snap fit projection is provided. All those and other possibilities which allow the first snap fit connector to flex may be provided alternatively or in combinations. It is to be noted that such a snap fit connection may be provided with other attachments than a comb attachment. Further, in the context of the invention the terms “first snap fit connector” and second snap fit connector” may refer to at least one of each such first and second snap fit connector but encompasses also two, three or more pairs of first and second snap fit connector (s).

This arrangement of a flexing first snap fit connector being provided at the cutting head provides several advantages. Usually the provision of flexibility to a snap fit connector increase it thickness or bulkiness in order to allow differentiating between walls which would flex and those which are not desired to flex. The cutting head provided sufficient space for that without adding anything to the dimensions of the comb attachment.

DETAILED DESCRIPTION OF THE INVENTION

Figure 1:
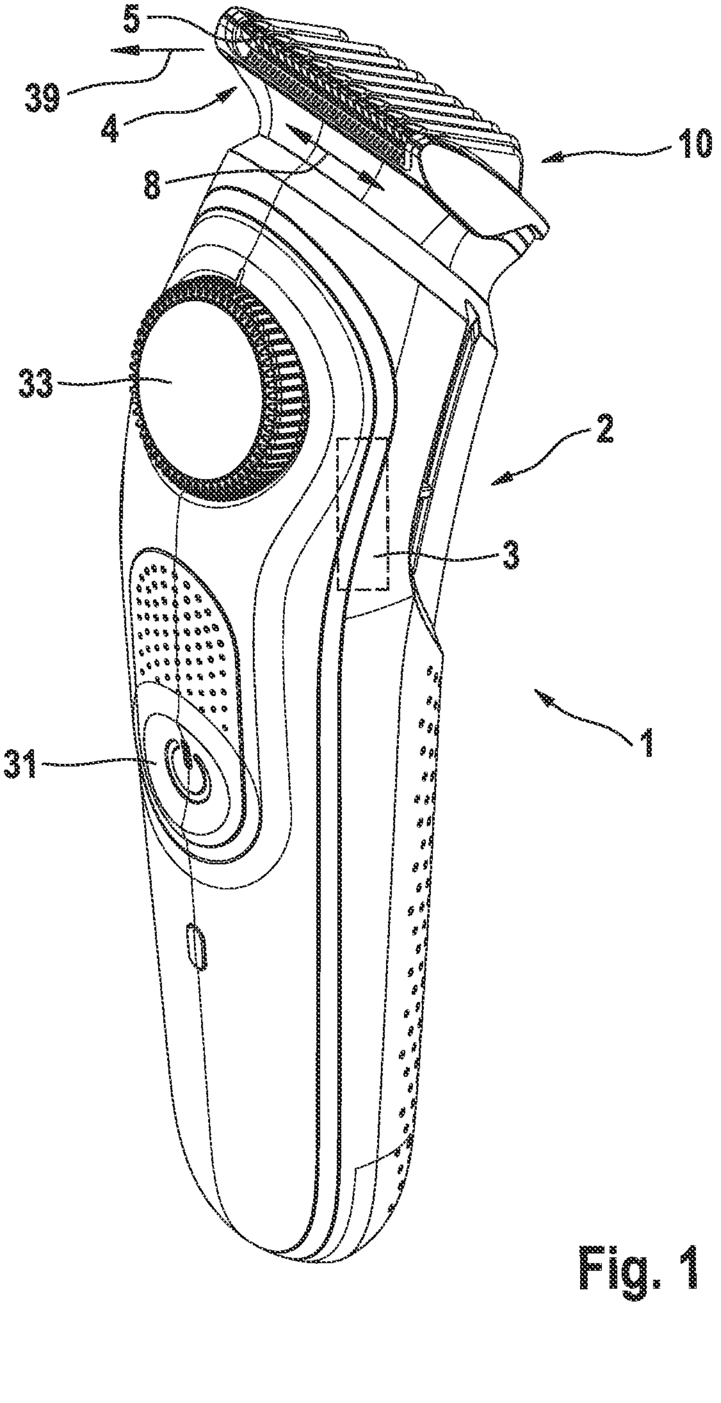
FIG. 1: a perspective view of a hair removal device and more particular of a hair trimmer with an attached comb according to the invention.

According to an advantageous aspect, the comb attachment 10 is provided with at least one row of comb teeth at a frontal side 13, a top skin side 14, an inside hair cutting head coupling side 15 and at least one lateral side 16*a*, 16*b*, wherein the at least one lateral side 16*a*, 16*b* is provided with a wall portion 18*a*, 18*b* that forms a finger gripping area 17*a*, 17*b* on the outside and the second snap fit connector 11 on the inside, so that one side of the wall portion is provided with the finger gripping area 17*a*, 17*b* and the opposite side of the wall portion 18*a*, 18*b* is provided with the second snap fit connector 11*a*, 11*b*. Thus the finger grip portion for attaching and detaching the comb onto the cutting head is the same area in which the second snap fit connector is provided (only provided on opposing sides of the same wall portion of the comb attachment). It is usually without adding further design features difficult to release said snap fit connection if at the same time the fingers press at said snap fit connection in order to grip the attachment.

According to another aspect of said hair removal device the comb attachment 10 is provided with two lateral sides 16*a*, 16*b* on opposite sides to each other and with a wall portion 18*a*, 18*b* on each of the two lateral sides 16*a*, 16*b*, wherein each of the wall portions 18*a*, 18*b* is provided with the finger gripping area 17*a*, 17*b* on the outside and the second snap fit connector 11*a*, 11*b* on the opposing inside. Thus, the comb attachment is not clamped onto the cutting head 4 when the lateral sides are gripped or pressed together in order to detach said comb 10.

Said second snap fit connector 11*a*, 11*b* is at least one of: formed in a shape, made of a material or supported less flexible than the first snap fit connector 9*a*, 9*b*. According to an example for this is the second snap fit connector rigid or non flexible or at least less flexible onto the comb (than compared to the flexibility provided by the material, shape or support of the first snap fit connector) which enables a slim lateral side design as no additional space is added to the width of the comb for providing a flex structure.

Moreover, the one or more second snap fit connector 11*a*, 11*b* is/are provided with a projection 19*a*, 19*b* projecting from the wall portion 18*a*, 18*b* and wherein the wall portion 18*a*, 18*b* is provided with a guide rail projection 20*a*, 20*b* adjacent to and aligned with the projection 19*a*, 19*b* of the second snap fit connector 11*a*, 11*b* so that both the projection 19*a*, 19*b* of the second snap fit connector 11*a*, 11*b* and the guide rail projection 20*a*, 20*b* serve to guide the comb attachment 10 at its inner lateral sides during attachment at the cutting head 4. According to an aspect said guide rail projection 20*a*, 20*b* is provided on both wall portions of both opposing lateral sides of the comb attachment 10 independent from whether this term is referred to in singular or plural form, so that preferably next to each of the snap fit projections of the second snap fit connector 11*a*, 11*b* is located a rip shaped guide rail projection 20*a*, 20*b*. Thus, when attaching the comb attachment 10 onto the cutting head 4 both the snap fit projection of the second snap fit connector and the guide rail projections serve to guide the comb in a gliding path.

The comb attachment 10 is provided to be attachable to the cutting head 4 in a direction 21 angled to or perpendicular to the reciprocation direction 8. The direction 21 is set by the afore-mentioned gliding path along which the comb attachments 10 glide during attachment.

The cutting head 4 is provided with a top skin side 21, at least one row of teeth 6*a*, 7*a* at a frontal end 23 at each of the first and second blades 6, 7 and at least one lateral side 24*a*, 24*b* which is provided with said first snap fit connector 9*a*, 9*b*.

According to an aspect of the hair removal device, said cutting head 4 is provided with two opposing lateral sides 24*a*, 24*b* wherein each of the lateral sides 24*a*, 24*b* is provided with said first snap fit connector 9*a*, 9*b*. Having a pair of first snap fit connector 9*a*, 9*b* assures safer connection of the comb with the cutting head 4.

According to another aspect of the hair removal device the at least one lateral side 24*a*, 24*b* of the cutting head 4 is provided with an indentation 25*a*, 25*b* and wherein the first snap fit connector 9*a*, 9*b* is projecting form said indentation 25*a*, 25*b*. Similar as for the guide rail projection and other features mentioned just in the connection with one side of the cutting head and the comb attachment the other opposing side is provided with the same features, so that when referring just to one of the lateral sides the other side is provided with the same structure independent from singular term form. Thus, the rip of the guide rail projection is guided along the path as defined by the indentation of the cutting head 4.

Further, the hair removal device comprises at least one indentation 25*a*, 25*b* which is shaped as a longitudinal guide groove for guiding the second snap fit connector 11*a*, 11*b* during attaching of the comb attachment 10 at the cutting head 4. The comb attachment and the cutting head are provided with cooperating key and slot structure which allows a guided attachment of the comb attachment 10 on the cutting head 4 until the first and second snap fit connectors engage with each other. This eases the handling of the attachment and detachment process and avoids a twisting of the snap fit connectors during said process.

According to an aspect the hair removal device is provided with a first snap fit connector 9*a*, 9*b* that is/are supported by a flexing tongue 26*a*, 26*b* (each). Thus, the first snap fit connector is each supported flexible and/or shaped flexible by flexing tongues.

Hair removal device according to anyone of the preceding claims, wherein (each of) the first snap fit 9*a*, 9*b* connector is surrounded by at least one slot 27*a*, 27*b*, in particular by two opposing slots 27*a*, 27*b* for allowing the first snap fit connector 9*a*, 9*b* to be depressed or move when pushed by the second snap fit connector 11*a*, 11*b* during attachment of the comb attachment 10. Thus the first snap fit connector is provided onto a beam in bending wall portion or a flexing tongue with connections to the cutting head housing at the two opposing short sides and slots 27*a*, 27*b* at the two long sides. This assures good flexing properties of the first snap connector without use of a different material component.

The two first snap fit connector 9*a*, 9*b* move or flex towards each other during connection of the comb attachment 10 and more preferably the move or flex direction 29 of the two first snap fit connector 9*a*, 9*b* substantially corresponds to the reciprocation direction 8. It is just the first snap fit connector that substantially move during engagement with the second snap fit connector of the comb attachment. The movement direction of the projection of the first snap fit connector is parallel to or slightly angled to the moveable blade's reciprocation direction.

The first snap fit connector 9*a*, 9*b* is one-piece integral with a cutting head housing 30. Thus, the first snap fit connector is formed by the same part as the cutting head housing which allows a manufacture of this plastic part by an injection molding process.

According to a further aspect a hair removal kit is provided, comprising said hair removal device according and an other comb attachment 10 releasably attachable to the cutting head 4, said other comb attachment having said (same) second snap fit connector 11*a*, 11*b* provided to engage by snap fit connection with the first snap fit connector 9*a*, 9*b* for attaching the other comb attachment at the cutting head 4. Accordingly, more comb or other attachments may be provided with a snap fit connecting structure that corresponds to that of the comb attachment 10 so that different attachments fit to the same snap fit connecting structure of the cutting head 4.

FIG. 1 shows a perspective view of a body- and/or beard hear trimming device 1 having a handle 2, a cutting head 4 which may be releasably connected to the handle or permanently connected to the handle 2. The handle 2 is provided with a on/off button 31 for switching a motor 3 provided inside of the handle 2 on and off. The motor 3 is provided with a drive shaft having an eccentric which is connectable with a cam 32 (see FIG. 3) of the cutting head 4. The handle 2 may be further provided with a rotating wheel 33 or other means for adjusting the hair trimming length.

At its upper end of the cutting head 4 a comb attachment 10 is releasably attached. The hair trimming length may be adjusted either by said adjusting wheel 33 and/or by attaching different comb attachments 10 to the cutting head which may be provided for specific hair trimming needs or different desired hair cutting lengths.

Figure 2:
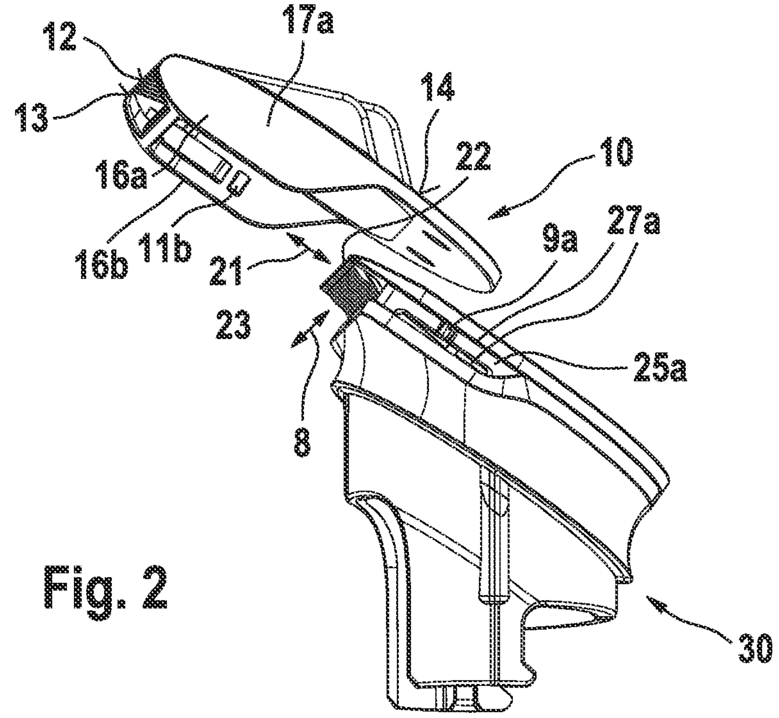
FIG. 2: a perspective side view of a cutting head with said comb attachment detached from the cutting head in accordance with the hair removal device of FIG. 1, FIG. 3: an exploded view of a cutting head with said comb attachment detached from the cutting head in accordance with the hair removal device of FIG. 1, FIG. 4: an underside view of said comb attachment in accordance with the hair removal device of FIG. 1, FIG. 5: a perspective view of said comb attachment in accordance with the hair removal device of FIG. 1, FIG. 6: a backside view said comb attachment in accordance with the hair removal device of FIG. 1, FIG. 7: a perspective view of a housing of a cutting head in accordance with the hair removal device of FIG. 1, and FIG. 8: a topside view of part of a housing of a cutting head in accordance with the hair removal device of FIG. 1.
Figure 3:
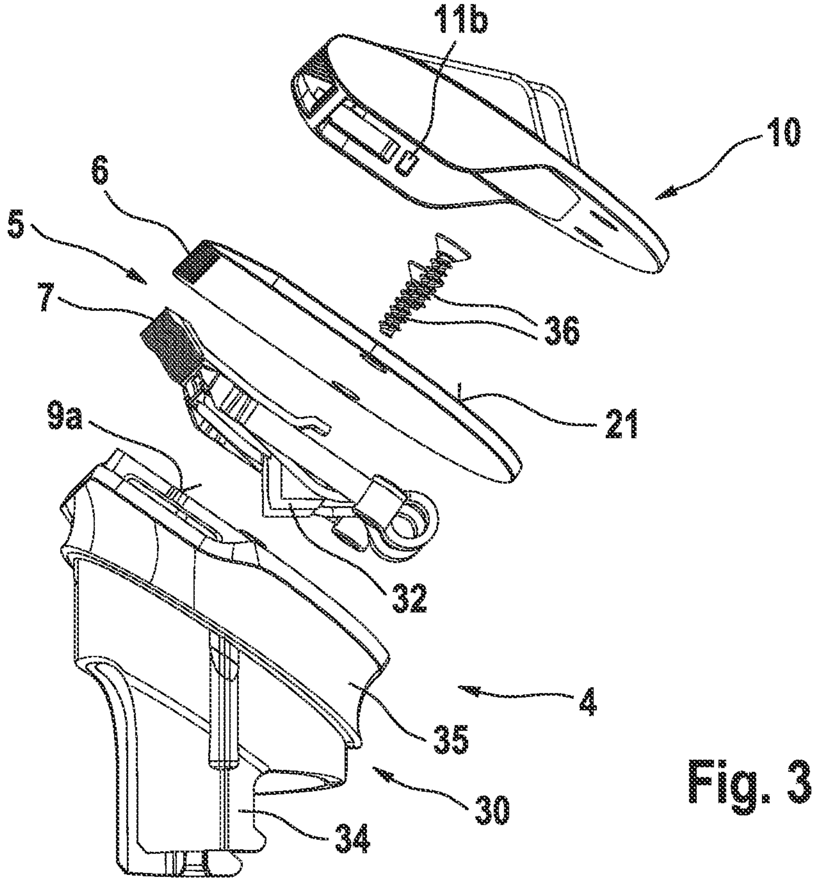

FIGS. 2 and 3 show the cutting head 4 with the comb attachment 10 detached. The hair cutting head 4 comprises a cutting head housing 30 made from plastic and a blade unit 5. A lower part 34 of said housing 30 is provided as connecting area with the handle 2. An upper part 35 of said housing 30 is visible when the cutting head 4 is connected with the handle 2. The housing 30 is a hollow part which is closed at its upper end by the stationary blade 6 of the blade unit 5. The stationary blade 6 may be made from full metal or plastic with metal teeth. In this case the stationary blade 6 is connected with the cutting head 4 by screws 36 but other connections are possible as well.

Another part of the blade unit 5 is the moveable first blade 7 which cooperates with the cam 32 in order to reciprocate in the direction 8 (see FIG. 1) sideways back and forth relative to the non moveable stationary second blade 6 when in engagement with the eccentric of the motor drive shaft and the motor 3 being operated. This movement direction 8 is parallel to a hair cutting edge formed by the tooth tips 6*a*, 7*a* of the stationary and/or moveable blade. Both blades 6, 7 have a row of hair cutting teeth at its frontal end.

Figure 4:
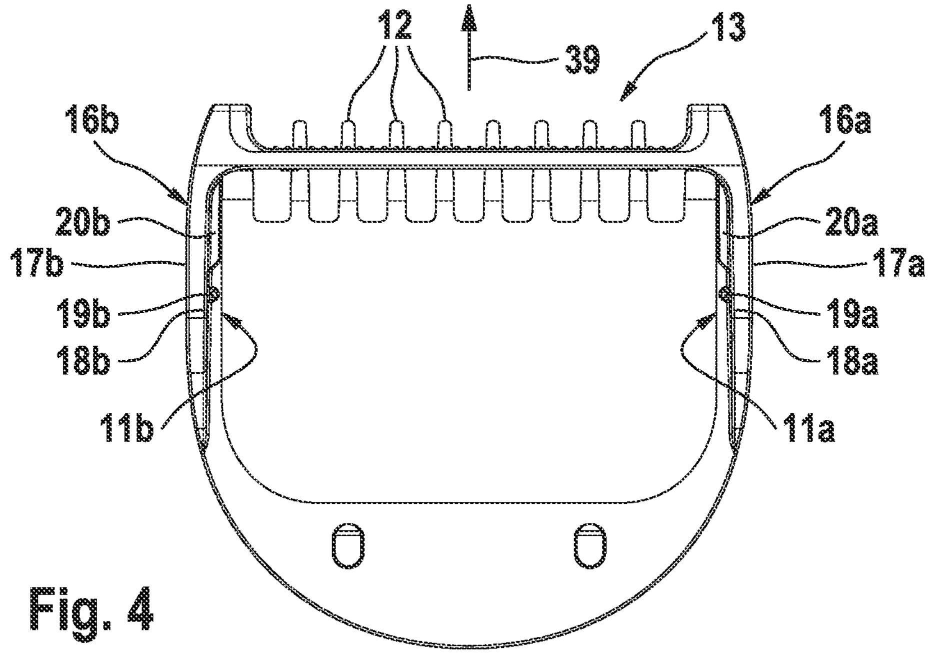
Figure 5:
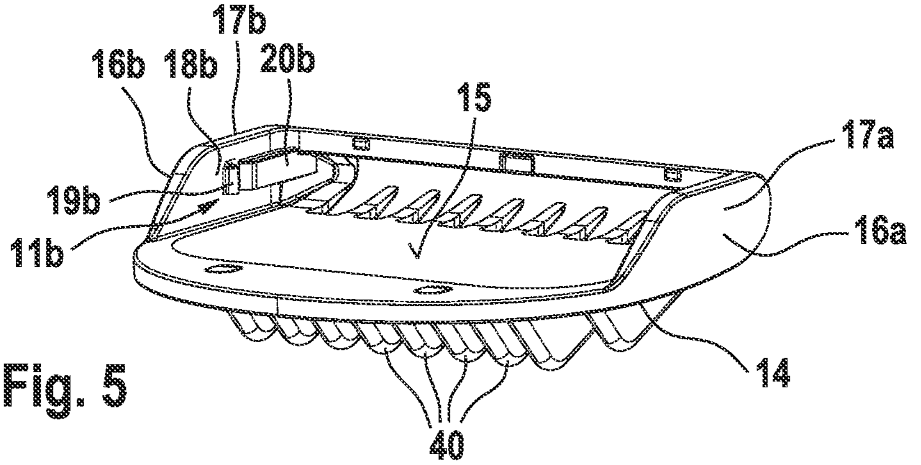
Figure 6:
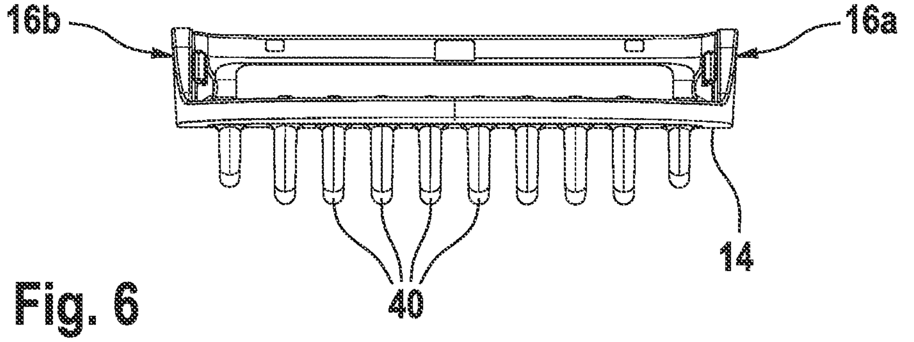

FIGS. 4, 5 and 6 illustrate the comb attachment 10 from different views all with the upper skin contact side shown as the lower side in these Figures. This skin contact side 14 is provided with additional multiple protruding hair combing rips 40.

The comb attachment 10 is formed like a sleeve that is shaped to be sleeved over the cutting head 4 so that the inside coupling side 15 is close or in contact to a skin side 21 of the cutting head 4. The comb attachment has a frontal side 13 that is the side which comes first in contact with the hairs to be combed and cut if the device is moved in direction 39 which is an extension of the longitudinal comb teeth 41. The comb teeth 41 are aligned in a row and at least partly cover the row of teeth of the blade unit 4. (see FIG. 1).

Perpendicular to the frontal side 13 with the comb teeth of the comb attachment 10 and laterally to this are provided two lateral sides 16*a*, 16*b* with wall portions 18*a*, 18*b*. Those wall portions 18*a*, 18*b* have insides which face each other and which are each provided with a projection 19*a*, 19*b* that serves as the second snap fit connector 11*a*, 11*b*. The snap fit projections 19*a*, 19*b* have a substantially U or V shape in cross section. In alignment with these snap fit projections 19*a*, 19*b* are longitudinal rip shaped guide rail projections 20*a*, 20*b* also in provided at the inside of the wall portions 18*a*, 18*b*. On each opposite side of the wall portions 18*a*, 18*b*, so not the inside but the outside the lateral sides are each provided with a finger gripping area 17*a*, 17*b*. This finger gripping area's 17*a*, 17*b* may be optionally provided with a structure for enhancing the gripping or may be just flat or without gripping texture. The lateral sides 16*a*, 16*b* and the wall portions 18*a*, 18*b* are substantially rigid. As there is no need for a flexing structure at the second snap fit connector 11*a*, 11*b* the lateral sides 16*a*, 16*b* adds not much thickness so that the comb attachment is less bulky.

Figure 7:
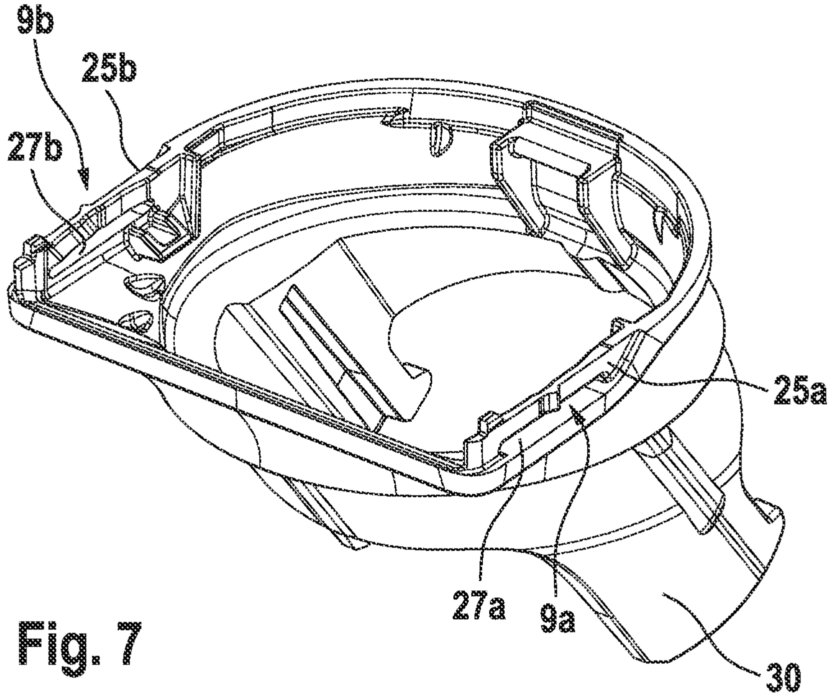
Figure 8:
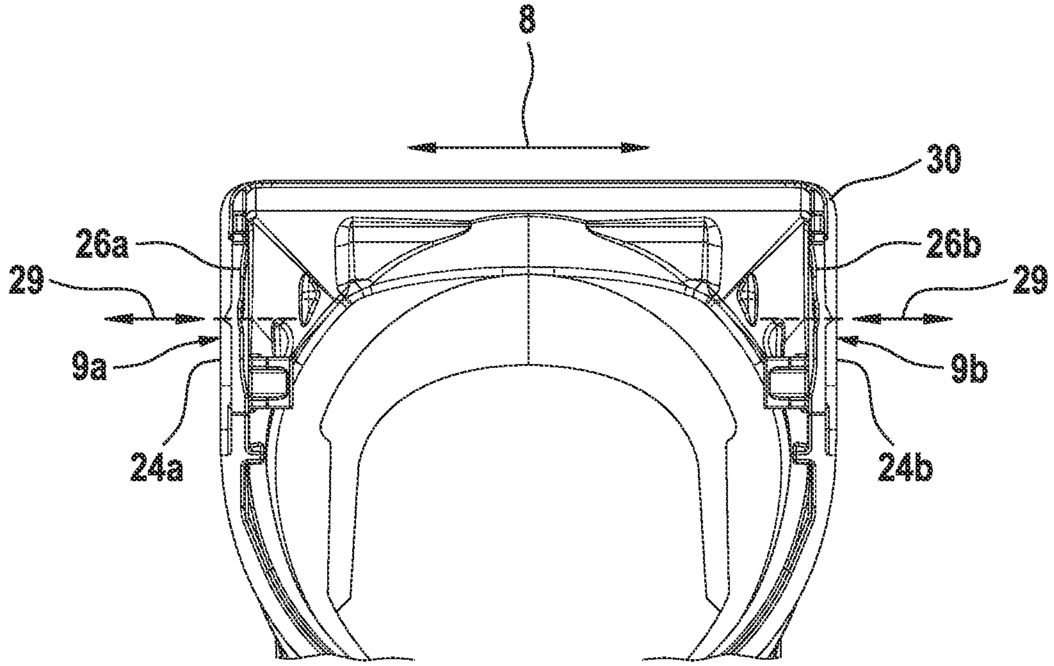

FIGS. 7 and 8 illustrate the housing 30 or part of it of the cutting head 4. The cutting head 4 has two lateral sides 24*a*, 25*b* each with substantially V- or U-shaped projections that form the first snap fit connector 9*a*, 9*b*. The snap fit connectors 9*a*, 9*b* are supported on a longitudinal tongue 26*a*, 26*b* which is connected only at it short sides with the rest of the housing 30. Thus there are slots 27*a*, 27*b* at both long sides at each of the tongues 26*a*, 26*b* so that the tongues are ease to be flexed and bend when a pushing force substantially in the direction of 29 which is perpendicular to the longitudinal extension of the tongues. This flexing assures that both first and second snap fit connectors are able to engage and disengage from each other during attachment and detachment of the comb 10. The upper second slot 27*a*, 27*b* is formed by a gap between the first, stationary blade 6 and the tongue 26*a*, 26*b* of the housing as can be seen in FIG. 2.

As illustrated by FIGS. 7 and 8 the first snap fit connector 9*a*, 9*b* and its supporting tongue 26*a*, 26*b* is located recessed relative to the surrounding housing 30 of the cutting head 4. Further the width extension of the second stationary blade 6 larger than the width extension of the first snap fit connector and the tongue supporting same so that these snap fit parts are also recessed relative to the second blade 6. As a consequence, a groove or indentation 25*a*, 25*b* is created in which the first snap fit connector slightly protrudes.

The comb attachment 10 is attached to the cutting head 4 in the direction 21 which corresponds to the movement direction 39 of the device for trimming hair and which is substantially perpendicular to the reciprocation direction of the first blade and or the hair cutting edge formed by the tooth tips of the blade unit 5. When sliding the comb attachment 10 onto the cutting head 4 the inside 15 of the comb attachment 10 slides on the skin surface 21 of the second blade 6. Further on the lateral sides of the comb attachment the comb is sleeved over the cutting head 4 by slidingly engaging the projections 19*a*, 19*b* of the second snap fit connector and the following guide rail projections 20*a*, 20*b* along the grooves or indentations 25*a*, 25*b* of the cutting head. A slight push of in the direction 21 while holding the comb 10 at the gripping area causes the first snap fit connector 9*a*, 9*b* to flex away in direction 29 which is perpendicular to the comb attachment sliding direction 21. As the grip areas of the comb attachment 10 are substantially rigid and the first snap fit connector of the cutting head is able to flex the finger gripping contact force also in direction 29 is not counteracting or preventing the smooth engagement or disengage of the snap fit connection although the first snap fit connector flexes away in the same direction 29 and at the same area 17*a*, 17*b* as the finger's grip the comb attachment 10.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Hair removal device, in particular an electric shaver or a hair trimmer, comprising:

a handle having a motor, a cutting head having a blade unit with a first and second blade for cutting hair, said blade unit being driven by said motor, so that at least one of said first and second blade reciprocates relative to the other in a reciprocation direction, said cutting head having a first snap fit connector and a comb attachment releasably attachable to the cutting head, said comb attachment having a second snap fit connector provided to engage by snap fit connection with the first snap fit connector for attaching the comb attachment at the cutting head, wherein, said first snap fit connector is at least one of: formed in a shape to flex, made of a material to flex or supported to flex, so that said first snap fit connector is able to flex when brought into engagement with said second snap fit connector, and the second snap fit connector is provided with a projection projecting from a wall portion and wherein the wall portion is provided with a guide rail projection adjacent to and aligned with the projection of the second snap fit connector so that both the projection of the second snap fit connector and the guide rail projection serve to guide the comb attachment at its inner lateral sides during attachment at the cutting head.

2. Hair removal device of claim 1, wherein the comb attachment is provided with at least one row of comb teeth at a frontal side, a top skin side, an inside hair cutting head coupling side and at least one lateral side, wherein the at least one lateral side is provided with the wall portion that forms a finger gripping area on the outside and the second snap fit connector on the inside, so that one side of the wall portion is provided with the finger gripping area and the opposite side of the wall portion is provided with the second snap fit connector.

3. Hair removal device according to claim 2, wherein the comb attachment is provided with two lateral sides on opposite sides to each other and with a wall portion on each of the two lateral sides, wherein each of the wall portions is provided with the finger gripping area on the outside and the second snap fit connector on the opposing inside.

4. Hair removal device according to claim 1, wherein said second snap fit connector is at least one of: formed in a shape, made of a material or supported less flexible than the first snap fit connector.

5. Hair removal device according to claim 1, wherein the comb attachment is provided to be attachable to the cutting head in a direction angled to or perpendicular to the reciprocation direction.

6. Hair removal device according to claim 1, wherein the cutting head is provided with a top skin side, at least one row of teeth at a frontal end at each of the first and second blades and at least one lateral side which is provided with said first snap fit connector.

7. Hair removal device according to claim 6, wherein said cutting head is provided with two opposing lateral sides wherein each of the lateral sides is provided with said first snap fit connector.

8. Hair removal device according to claim 6, wherein the at least one lateral side of the cutting head is provided with an indentation and wherein the first snap fit connector is projecting form said indentation.

9. Hair removal device according to claim 8, wherein said at least one indentation is shaped as a longitudinal guide groove for guiding the second snap fit connector during attaching of the comb attachment at the cutting head.

10. Hair removal device according to claim 1, wherein the first snap fit connector is supported by a flexing tongue.

11. Hair removal device according to claim 1, wherein the first snap fit connector is surrounded by at least one slot.

12. Hair removal device according to claim 7, wherein the two first snap fit connector move or flex towards each other during connection of the comb attachment and the move or flex direction of the two first snap fit connector substantially corresponds to the reciprocation direction.

13. Hair removal device according to claim 1, wherein the first snap fit connector is one piece integral with a cutting head housing.

14. Hair removal kit comprising a hair removal device according to claim 1, wherein another comb attachment releasably attachable to the cutting head is provided, said other comb attachment having said second snap fit connector provided to engage by snap fit connection with the first snap fit connector for attaching the other comb attachment at the cutting head.

* * * * *